(12) United States Patent
Takahashi et al.

(10) Patent No.: US 8,646,554 B2
(45) Date of Patent: Feb. 11, 2014

(54) RADIATOR CORE SUPPORT

(75) Inventors: Go Takahashi, Saitama (JP); Hiroshi Toyoura, Saitama (JP)

(73) Assignee: Calsonic Kansei Corporation, Saitama-shi (JP)

( * ) Notice: Subject to any disclaimer, the term of this patent is extended or adjusted under 35 U.S.C. 154(b) by 538 days.

(21) Appl. No.: 12/933,171

(22) PCT Filed: Mar. 18, 2009

(86) PCT No.: PCT/JP2009/055239
§ 371 (c)(1),
(2), (4) Date: Sep. 17, 2010

(87) PCT Pub. No.: WO2009/119396
PCT Pub. Date: Oct. 1, 2009

(65) Prior Publication Data
US 2011/0011661 A1 Jan. 20, 2011

(30) Foreign Application Priority Data
Mar. 26, 2008 (JP) .................. 2008-079538

(51) Int. Cl.
*B60K 11/04* (2006.01)
(52) U.S. Cl.
USPC .......................... 180/68.4; 165/67
(58) Field of Classification Search
USPC .............. 180/68.1, 68.4, 68.6, 291, 296, 312; 123/41.43; 296/193.09; 165/41
See application file for complete search history.

(56) References Cited

U.S. PATENT DOCUMENTS

| | | | | |
|---|---|---|---|---|
| 5,348,114 A * | 9/1994 | Yamauchi | ...................... | 180/291 |
| 5,409,288 A * | 4/1995 | Masuda | ................... | 296/193.09 |
| 6,189,958 B1 * | 2/2001 | Guyomard et al. | ...... | 296/193.09 |
| 6,412,855 B1 * | 7/2002 | Cantineau et al. | ........ | 296/187.01 |
| 6,450,276 B1 * | 9/2002 | Latcau | ......................... | 180/68.4 |
| 6,681,876 B1 * | 1/2004 | Haneda et al. | ............... | 180/68.4 |
| 6,715,573 B2 * | 4/2004 | Emori et al. | ................. | 180/68.4 |
| 6,729,424 B2 * | 5/2004 | Joutaki et al. | ................ | 180/68.4 |
| 6,923,495 B2 * | 8/2005 | Kishikawa et al. | ...... | 296/193.09 |
| 6,973,984 B2 * | 12/2005 | Cheron et al. | ............... | 180/68.1 |
| 7,108,092 B2 * | 9/2006 | Suwa et al. | .................... | 180/68.4 |
| 7,117,926 B2 * | 10/2006 | Mori et al. | ...................... | 165/67 |
| 7,287,613 B2 * | 10/2007 | Kim | ............................. | 180/68.4 |
| 7,914,071 B2 * | 3/2011 | Saitou et al. | ............... | 296/193.09 |
| 7,926,870 B2 * | 4/2011 | Lorenzo et al. | ............. | 296/193.1 |
| 8,167,068 B2 * | 5/2012 | Riviere | ........................ | 180/68.4 |
| 2002/0070062 A1 * | 6/2002 | Joutaki et al. | ................ | 180/68.4 |
| 2002/0084122 A1 * | 7/2002 | Emori et al. | ................. | 180/68.4 |
| 2002/0162695 A1 * | 11/2002 | Ozawa et al. | ................ | 180/68.2 |

(Continued)

FOREIGN PATENT DOCUMENTS

| | | | |
|---|---|---|---|
| JP | 2003-095011 A | 4/2003 |
| JP | 2006-103643 A | 4/2006 |
| JP | 2006-192983 A | 7/2006 |
| JP | 2007-126020 A | 5/2007 |

*Primary Examiner* — Katy M Ebner
*Assistant Examiner* — Brodie Follman
(74) *Attorney, Agent, or Firm* — Foley & Lardner LLP

(57) ABSTRACT

In a radiator core support 1 having a hood lock stay member 3, which is provided with a hood lock 14, on a radiator core support 1 of a motor vehicle, a transmission means is provided to connect between the hood 7 of a vehicle body to directly transmit load acting on the hood lock 14 from an engine hood from the hood lock stay member 3 to the side members 1.

11 Claims, 11 Drawing Sheets

(56) References Cited

U.S. PATENT DOCUMENTS

| | | | |
|---|---|---|---|
| 2003/0062148 A1* | 4/2003 | Ohki ............................ 165/41 |
| 2004/0011513 A1* | 1/2004 | Haneda et al. ............... 165/148 |
| 2004/0084236 A1* | 5/2004 | Okai et al. .................. 180/68.4 |
| 2005/0253419 A1* | 11/2005 | Kwon ...................... 296/193.09 |
| 2006/0081354 A1* | 4/2006 | Miura et al. .................. 165/41 |
| 2006/0156547 A1* | 7/2006 | Tarahomi ..................... 29/897.2 |
| 2006/0213640 A1* | 9/2006 | Matsuoka et al. ............ 165/67 |
| 2006/0225933 A1* | 10/2006 | Kwun et al. ................ 180/68.6 |
| 2008/0185872 A1* | 8/2008 | Povinelli et al. ......... 296/193.09 |
| 2008/0203766 A1* | 8/2008 | Hemmersmeier ....... 296/203.02 |
| 2009/0026806 A1* | 1/2009 | Riviere et al. ............ 296/193.09 |
| 2009/0108631 A1* | 4/2009 | Jyo et al. .................. 296/193.09 |
| 2009/0146456 A1* | 6/2009 | Saitou et al. ............. 296/187.09 |
| 2010/0044007 A1* | 2/2010 | Sensui et al. .................... 165/67 |
| 2010/0078149 A1* | 4/2010 | Yoshimitsu et al. ............ 165/67 |
| 2010/0213742 A1* | 8/2010 | Ritz ........................ 296/193.09 |
| 2010/0277942 A1* | 11/2010 | Nakagawa .................... 362/549 |
| 2011/0037292 A1* | 2/2011 | Owen et al. ............. 296/193.09 |

* cited by examiner

RADIATOR CORE SUPPORT

TECHNICAL FIELD

The present invention relates to a radiator core support which is provided at a front side portion of a motor vehicle or the like to support a heat exchanger such as a radiator.

Prior documents, Japanese Patent Applications Laid-Open Publication No. 2006-103643, No. 2007-126020 and No. 2003-95011, disclose a technology of a radiator core support which is provided on the radiator core support of a motor vehicle with a hood lock stay that has a hood lock. Such a prior radiator core support is constructed in such a way that load acting on a hood lock through an engine hood is transmitted to an entire portion of the radiator core support through the hood lock stay so as to be thereby absorbed.

BACKGROUND OF THE INVENTION

Disclosure of the Invention

Problem(s) to be Solved by the Invention

However, recently there is a trend toward larger withstanding load necessary for hood locks according to enlargement of engine hoods (vehicle bodies), which causes a problem in that the radiator core support is insufficient in strength and a radiator core upper support member or others deform in the prior radiator core support in which impact load or the like generated when the engine hood drops is transmitted to the entire portion of the radiator core support through the hood lock stay and is thereby absorbed.

As a result, design changes aimed at improvement in strength of a radiator core support (for example, a change in material from plastic material to metal material, a change in wall thickness of each portion of the radiator core support, addition of and/or change in reinforcement ribs, and other changes) are needed. This increases manufacturing costs and weights thereof.

The present invention is made in order to solve the above-described problem, and its object is to provide a radiator core support which can satisfy necessary withstanding load of a hood lock without strength poverty of the radiator core support by means of transmission of load acting on the hood lock to side members of a vehicle body.

Means for Solving the Problems

In a radiator core of the present invention, the radiator core support is provided on a radiator core support of a vehicle body with a hood lock stay that has a hood lock, and the radiator core support is provided with a transmission element.

The radiator core support includes a radiator core support main body and a hood lock stay member. The radiator core support main body includes a radiator core upper support, a radiator core lower support, and radiator core side supports. The radiator core upper support extends in a lateral direction of the vehicle body. The radiator core lower support is arranged below and parallel to the radiator core upper support. The radiator core side supports connects end portions of the radiator core upper supports and the radiator core lower support.

The hood lock stay member includes the hood lock stay, the hood lock and a connecting element. The hood lock is provided on the hood lock stay to be engageable with an engine hood. The transmission element is provided to connect the hood lock stay and side members of a vehicle body in order to transmit a load acting on the hood lock from the hood lock stay to the side members.

The radiator core support main body comprises side member attachment portions that are provided at intermediate portions of each radiator core side support and are fixed with the side members of the vehicle body. The hood lock stay member comprises hood lock side stays that are arranged at positions higher than positions of the side member attachment portions and that extend in a lateral direction of the vehicle body to be fixed with radiator core side supports. The hood lock provided on each of the hood lock side stays, and hood lock stay brackets, acting as the transmission element, are connected in proximity to the hood locks of the hood lock side stays so as to extend toward the side member attachment portions comprising the head stay brackets and to be fixed with the side members.

Effect of the Invention

In the radiator core support of the present invention, there is provided the transmission means which connects between the hood lock stay and the side members of the vehicle body to directly transmit the load acting on the hood lock from the engine hood to the side members through the hood lock stay.

Therefore, this satisfies a necessary withstanding load of the hood lock without strength poverty of the radiator core support by means of the direct transmission of the load acting on the hood lock to the side members through the hood lock stay.

In this case, the hood lock stay is connected with the side members, and the hood lock stay, right and left hood ledges of the vehicle body, which are formed to have a closed cross sectional configuration in a lateral direction of the radiator core support and are positioned over the side members, and the side members are connected with one another. Therefore, excess load acting in a vertical direction of the vehicle body is not transmitted, thereby the rigidity of the vehicle body being improved. As a result, the controllability and stability by a driver can be assured.

Figure 1:
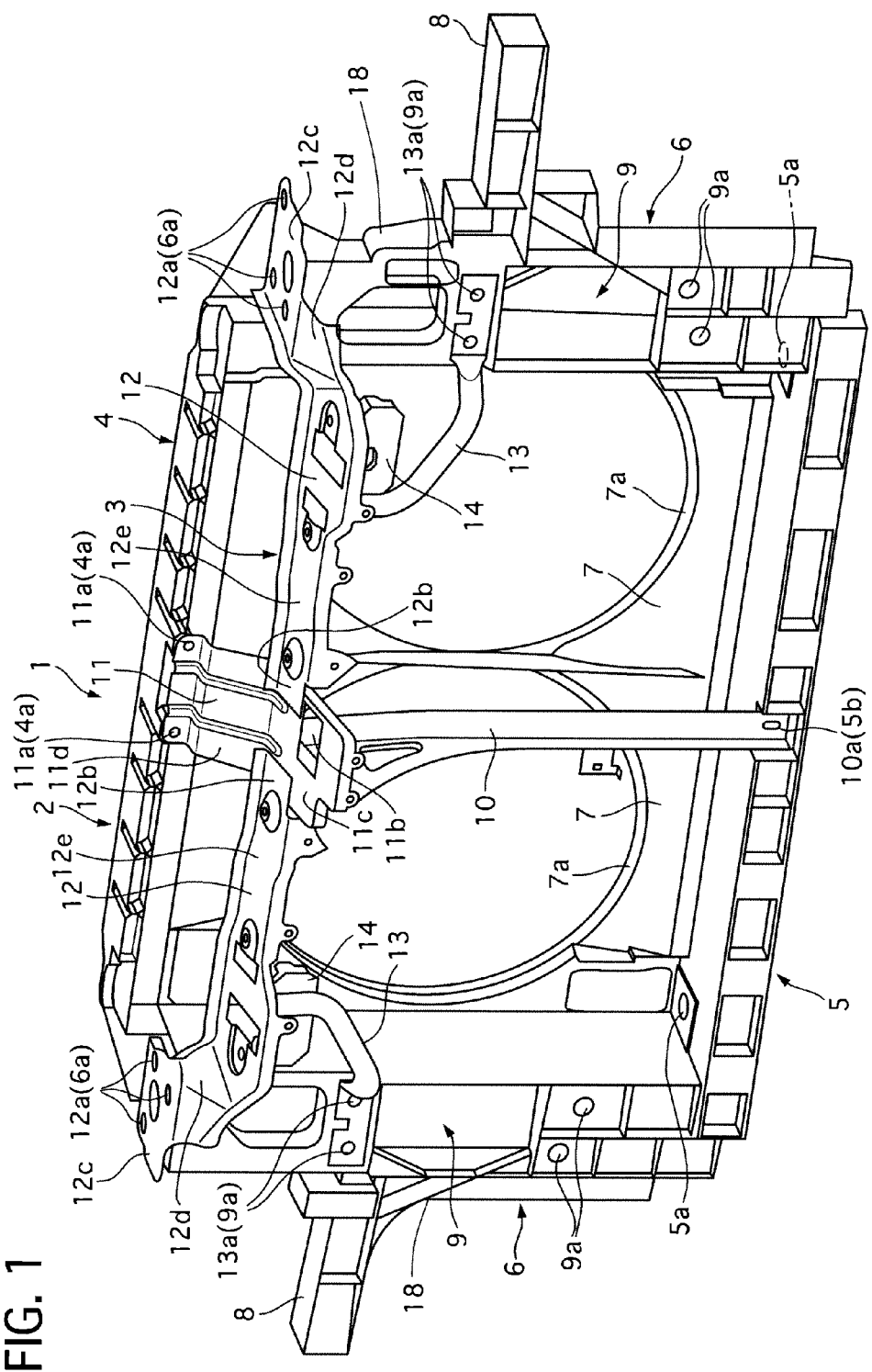
FIG. 1 is a perspective view, seen from a front side, showing a radiator core support of a first embodiment according to the present invention.

DESCRIPTION OF REFERENCE NUMBERS 1 radiator core support
2 radiator core support main body
3 hood lock stay member
4 radiator core upper support
4a, 5a, 5b, 6a, 9a, 10a, 11a, 12a, 13a, 16a, 17a, 32a fixation hole
5 radiator core lower support
6 radiator core side support
7 shroud portion
7a opening portion
8 head lamp stay
9 side member attachment portion
10 hood lock center stay
11 center upper portion
11b opening portion
11c connecting portion
11d attachment portion
12 hood lock side stay
12b base end portion
12c end portion
12d rising portion
12e main body portion
13 hood lock stay bracket
14 hood lock
15 bumper armature
16 bumper stay
16b flange portion
17 side member
17b flange portion
18 radiator core upper side support
19 reinforcement member
20 first reinforcement member
21 bolt
30 second reinforcement member
31 main body portion
32 attachment portion
33 bolt

BEST MODE FOR CARRYING OUT THE INVENTION

Hereinafter, embodiments of the present invention will be described with reference to the accompanying drawings.

First Embodiment

Hereinafter, a first embodiment will be described.

Incidentally, a longitudinal direction of a motor vehicle and a lateral direction of the motor vehicle are referred as a front and rear direction and a right and rear direction, respectively.

Figure 2:
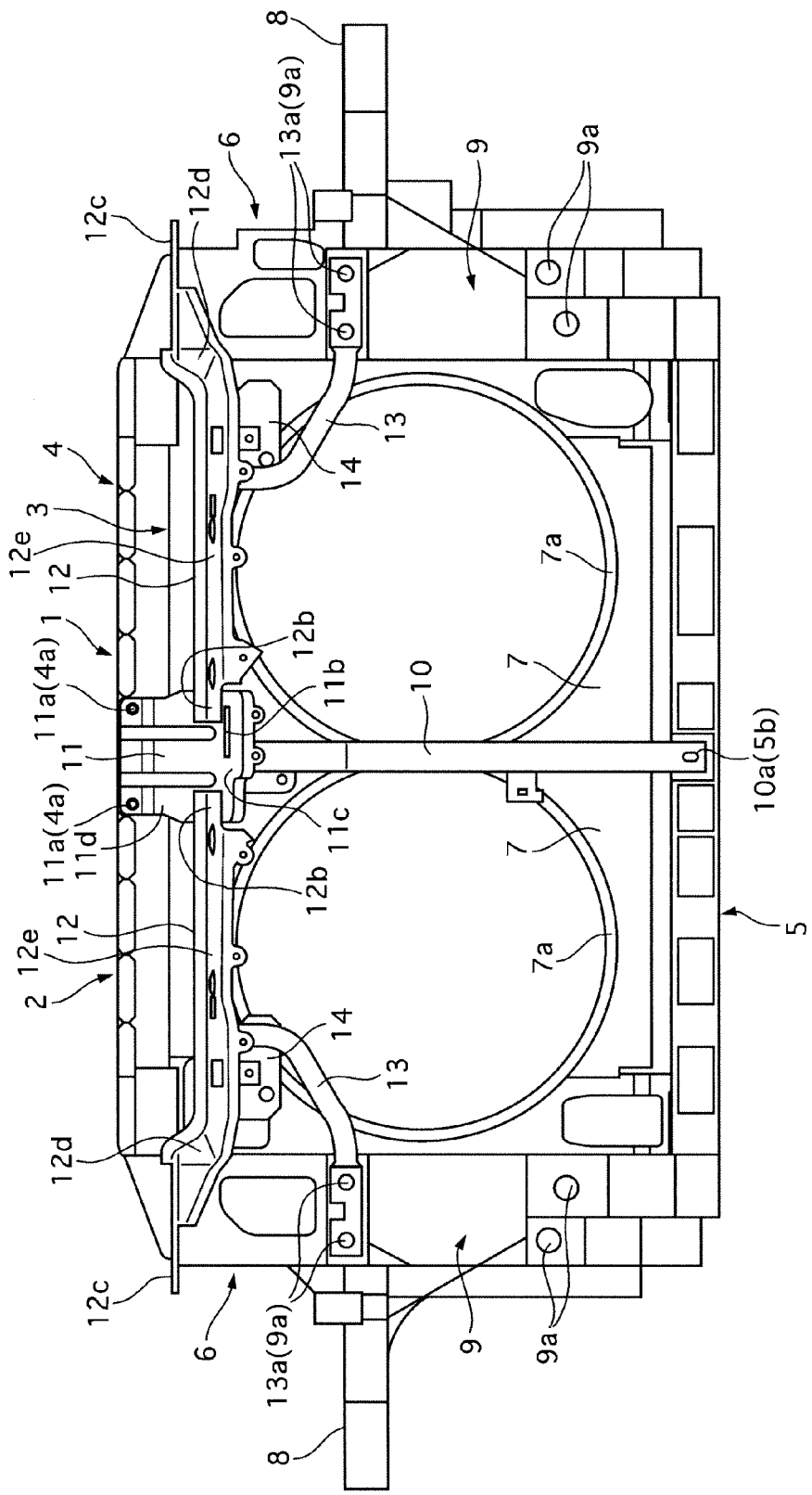
FIG. 2 is a front view showing the radiator core support of the first embodiment.
Figure 3:
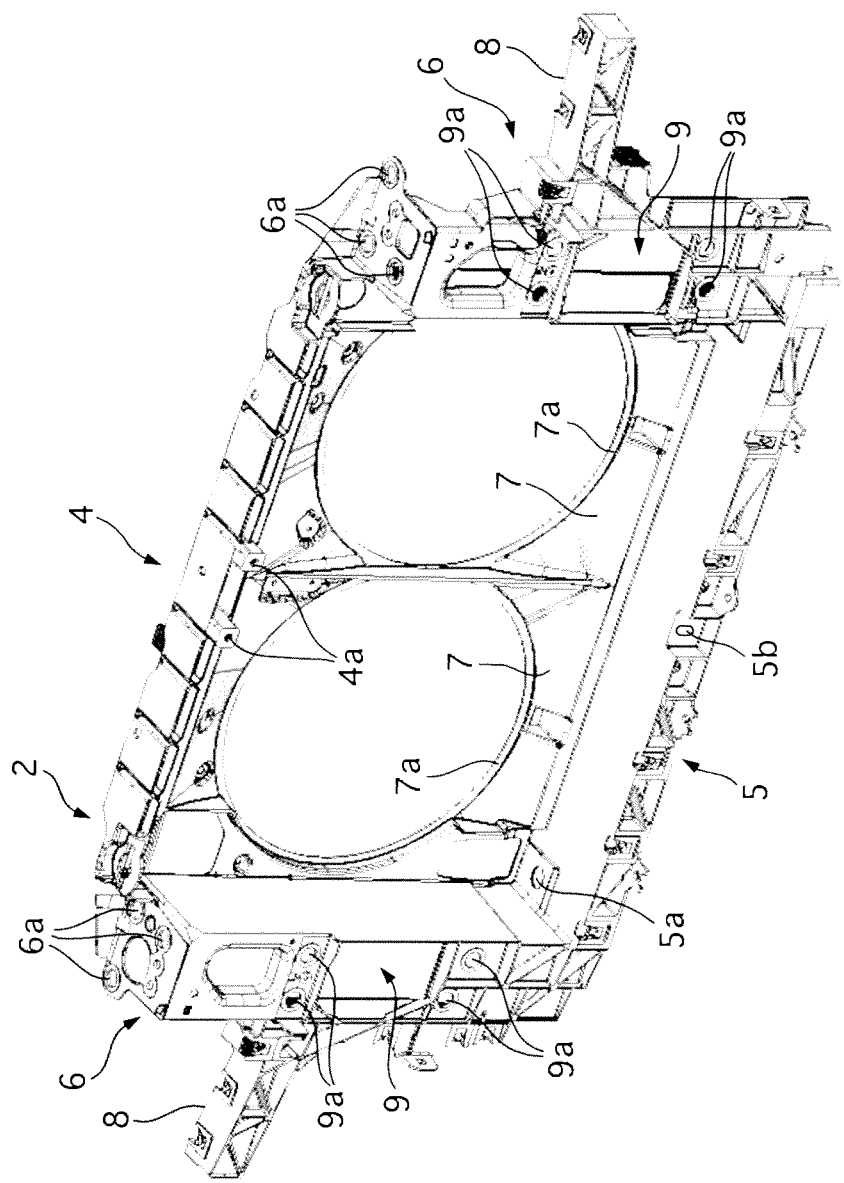
FIG. 3 is a perspective view showing a radiator core support main body of the first embodiment.
Figure 4:
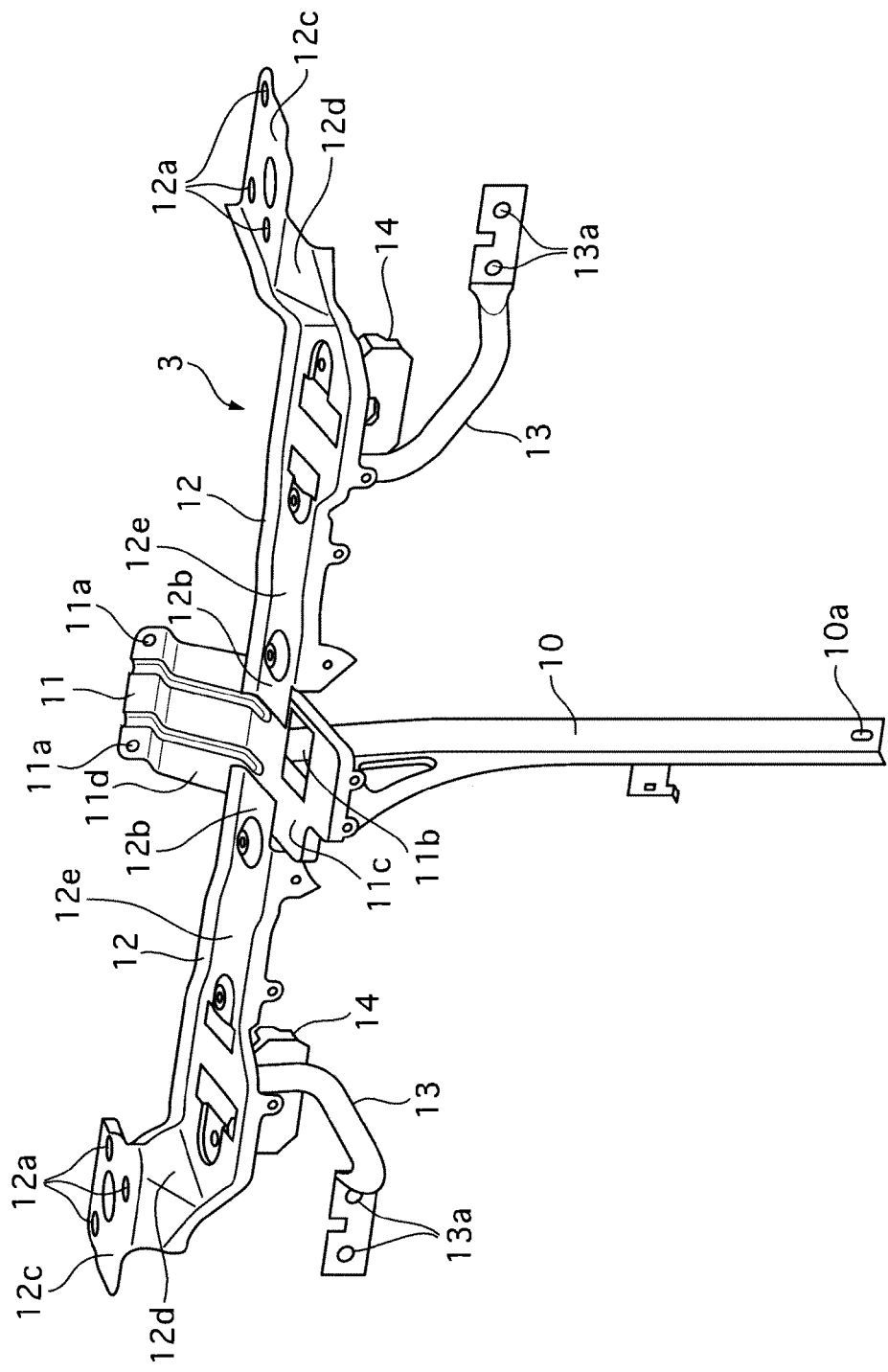
FIG. 4 is a perspective view showing a hood lock stay member of the first embodiment.

FIG. 1 is a perspective view, seen from a front side, showing a radiator core support of the first embodiment, FIG. 2 is a front view of the same, FIG. 3 is a perspective view of a radiator core support main body of the first embodiment, and FIG. 4 is a perspective view showing a hood lock stay member of the first embodiment.

Figure 5:
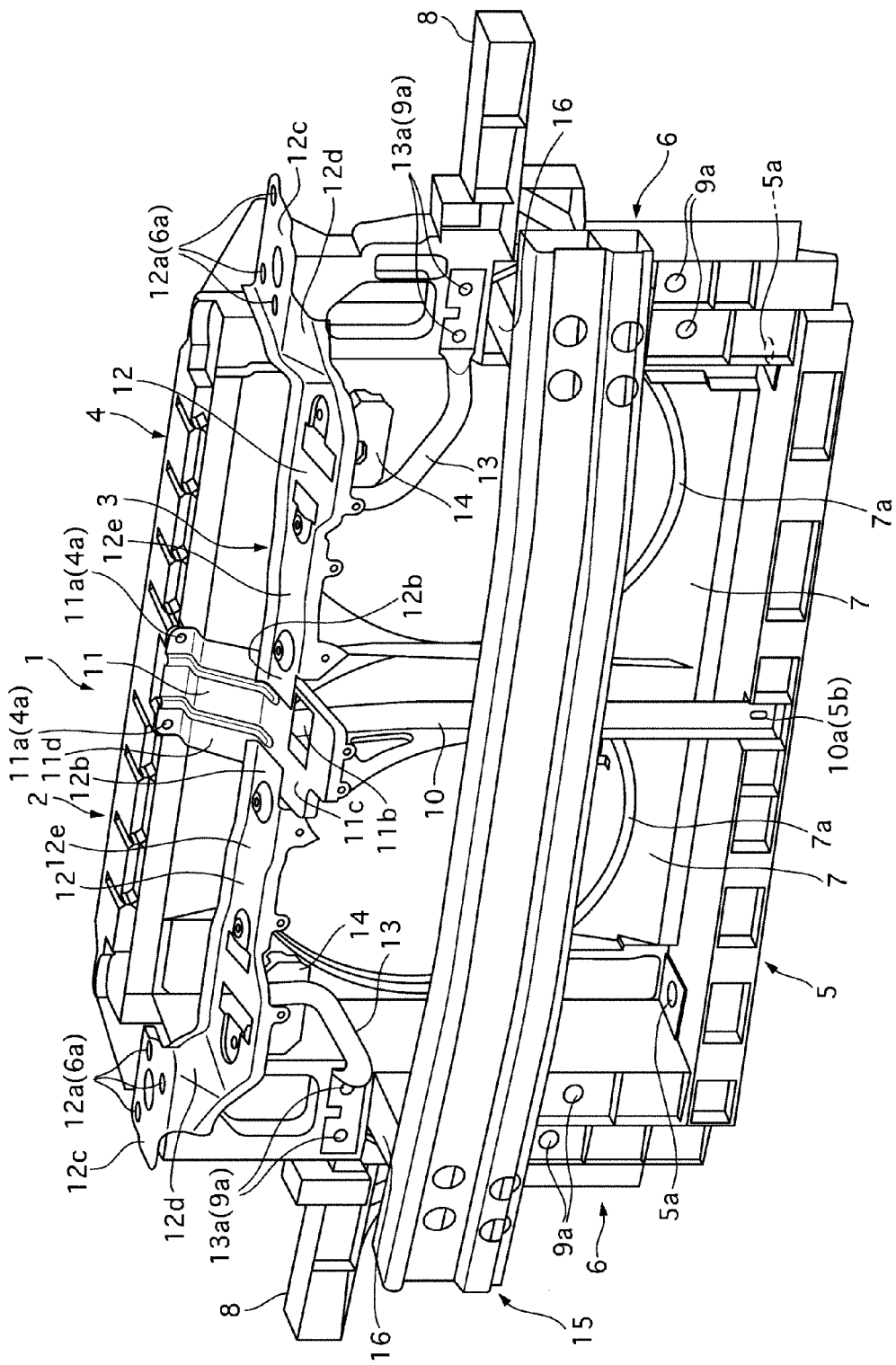
FIG. 5 is a perspective view showing an assembly state of the radiator core support of the first embodiment, side members, bumper stays and a bumper armature.
Figure 6:
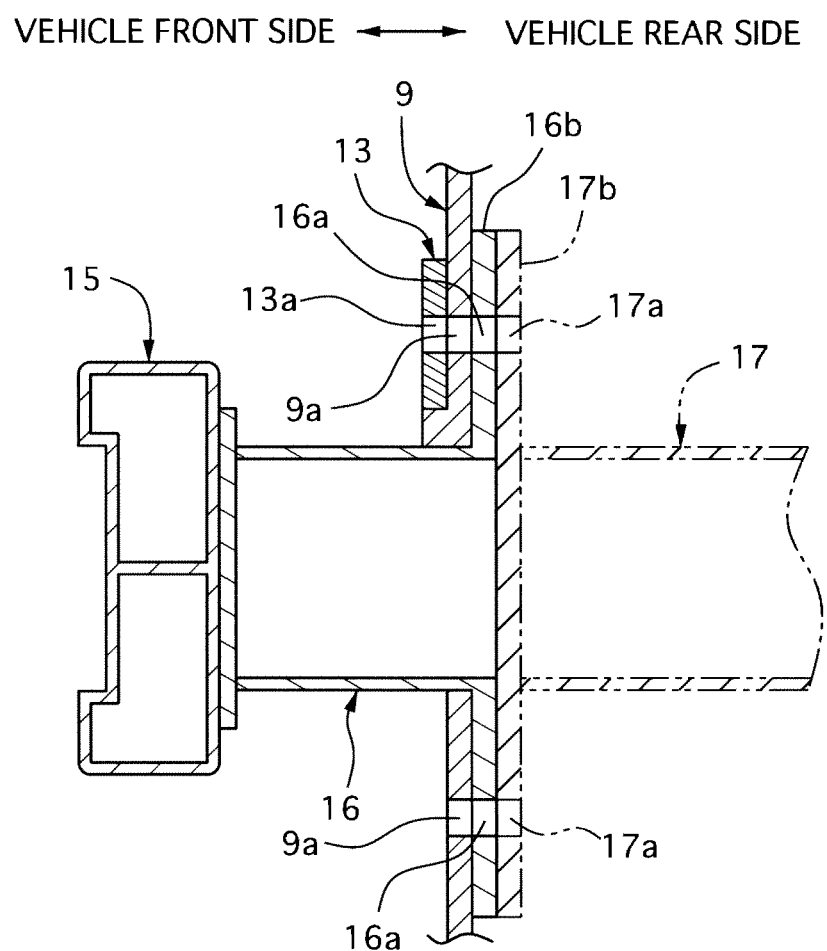
FIG. 6 is a cross sectional view, partially not illustrated, explaining an assembly state of the radiator core support of the first embodiment, the side members, the bumper stays and the bumper armature.

FIG. 5 is a perspective view showing an assembly state of the radiator core support of the first embodiment, side members, bumper stays and a bumper armature, and FIG. 6 is a cross sectional view, partially not illustrated, explaining an assembly state of the radiator core support of the first embodiment, the side members, the bumper stay and the bumper armature.

First, an entire structure of the first embodiment will be described.

As shown in FIG. 1 and FIG. 2, the radiator core support 1 of the first embodiment is constituted of a radiator core support main body 2 made of plastic material and a hood lock stay member 3 made of metal material. Incidentally, the hood lock stay member 3 corresponds to a hood lock stay of the present invention.

As shown in FIG. 3, the radiator core support main body 2 includes a radiator core upper support 4 extending in the right and left direction, a radiator core lower support 5 arranged below and parallel to the radiator core upper support 4, radiator core side supports 6 and 6 respectively connecting both end portions of the radiator core upper support 4 and the radiator core lower support 5, a shroud portion 7 extending inward from the radiator core upper support 4, the radiator core lower support 5 and the radiator core side supports 6 and 6 and forming circular opening portions 7a and 7a, and others.

The radiator core upper support 4 is formed with two fixation holes 4a on a front side surface of a center portion thereof.

The radiator core side supports 6 and 6 are formed in each upper portion thereof with three fixation holes 6a that open in the up and down direction thereof.

In addition, each radiator core side support 6 is provided on an intermediate portion thereof with a head lamp stay 8 that supports a not-shown lamp. Further, each radiator core side support 6 is provided on the intermediate portion thereof with a side member attachment portion 9 that has two fixation holes 9a that open in the front and rear direction.

The radiator core side lower support 5 is formed in upper surfaces at left and right sides thereof with fixation holes 5a (refer to FIG. 1) which are in a state where they are opened in the up and down direction so as to fix right and left lower end portions of a not-shown and known heat exchanger (refer to Japanese Patent Applications Laid-Open Publication No. 2007-126020), and not-shown two fans are provided behind the heat exchanger in a state where they face the opening portions 7a and 7a.

In addition, the radiator core lower support 5 is formed with a fixation hole 5b in a front surface at the center portion thereof.

Incidentally, the radiator core support main body 2 may be made of metal material or formed by using a resin mold method so as to have a part made of metal material.

As shown in FIG. 4, the hood lock stay member 3 is formed entirely like a letter T. A hood lock center stay 10 extends like a pillar in the up and down direction, and it is formed in a lower end portion thereof with a fixation hole 10a at a position corresponding to that of the fixation hole 5b of the radiator core lower support 5.

An upper portion of the hood lock center stay 10 is fixed by not-shown bolts with a connecting portion 11c of a center upper portion 11 like a plate bent like a letter L, consisting of the connecting portion 11c that is about horizontally arranged and an attachment portion 11d that extends obliquely upward from a rear end of the connecting portion 11c toward a front surface of the radiator core upper support 4.

The attachment portion 11d of the center upper portion 11 is formed in an upper end portion thereof with fixation holes 11a at positions corresponding to those of the fixation holes 4a of the radiator core upper support 4.

The right and left end portions of the connecting portion 11c are fixed by not-shown bolts with base end portions 12b and 12b of a pair of (right and left) hood lock side stays 12 and 12 that are formed like a plate and extend in the right and left direction at a position higher that that of the side member attachment portion 9.

That is, in the first embodiment, the hood lock side stays are formed in a state where a hood lock side stay is divided in two parts at its central portion.

An end portion 12c of each hood lock side stay 12 is set, through a rising portion 12d, to be at a position higher than that of a main body portion 12e, and it is formed with fixation holes 12a at positions corresponding to those of the fixation holes 6a of the radiator core side supports 6.

In addition, an intermediate portion of the main body portion 12e of each hood lock side stay 12 is fixed, by not-shown bolts, with an end portion of a hood lock stay bracket 13 having high strength and formed like a pipe extending toward the contiguous side member attachment portion 9, while the other end portion of the hood lock stay bracket 13 is formed with fixation holes 13a at positions corresponding to those of upper two of four fixation holes 9a of the side member attachment portion 9.

Further, the main body portion 12e of each hood lock side stay 12 is provided with a hood lock stay 14 that is designed to open and close a not-shown engine hood according to engagement with and disengagement from a striker that is provided on a front end potion of the engine hood.

The hood lock is a main latch, being provided to face an opening portion 11b of the connecting portion 11c of the center upper portion 11, although a secondary latch is not illustrated.

Incidentally, a part of the hood lock stay member 3 may be made of plastic material, and a detail structure and a fixing method (welding, fixing by bolts, using plastic clips, using resin mold, and others) of the hood lock stay member 3 and the radiator ore support 1 may be set appropriately.

Then, as shown in FIG. 1 and FIG. 2, the fixation hole 5b of the radiator core lower support 5 of the radiator core support main body 2, the fixation holes 4a of the radiator core upper support 4 thereof, and the fixation holes 6a of the radiator core side supports 6 thereof are adjusted to the fixation hole 10a of the hood lock center stay 10 of the hood lock stay member 3, the fixation holes 11a of the center upper portion 11 and the fixation holes 6a of the radiator core side supports 6, respectively, and then they are connected with each other by not-show bolts being inserted therein and fixed therewith.

Further, when the radiator core support 1 is assembled with the vehicle body, as shown in FIG. 5 and FIG. 6, the front surface of each side member attachment portion 9 is overlapped with the other end portion of the corresponding hood lock stay bracket 13, and the rear surface thereof is overlapped with flange portion 16b of the corresponding bumper stay 16 and flange portions 17b of the side members 17 arranged behind the flange portions 16b. The flange portions 16b are connected with the both end portions in the right and left direction of the bumper armature 15, and the flange portions 17b belong to the vehicle body. In this state, the two fixation holes 13a at the right and left sides of each hood lock stay bracket 13, the upper two fixation holes 9a of each side member attachment portion 9, the two upper fixation holes 16a formed in each flange portions 16b and the upper two fixation holes 17a formed in each flange portions 17a are inserted by not-shown bolts and are fixed with one another.

Further the fixation holes 9a, 16a and 17a formed in two lower portions of the side member attachment portions 9, the flange portions 16b of the bumper stays 16 and the flange portions 17b of the side members 17 are inserted by not-shown bolts and are fixed with one another.

Incidentally, an assembly structure of the side member attachment portions 9, the hood lock stay brackets 13, the bumper stays 16 and the side members 17 is not limited to the above-described one, and the point is that the hood lock stay brackets 13 and the side members 17 are fixed with each other.

Further, as shown in FIG. 1, the end portions 12c of the hood lock side stays 12 of the hood lock stay member 3 are fixed by not-shown bolts with both of the corresponding upper portions of the radiator core side supports 6 and the radiator core upper side support 18 that is made of metal material and fixed on a not-shown hood ledge of the vehicle body.

Next, the operation of the first embodiment will be described.

In thus constructed radiator core support 1, load, which is generated due to opening and closing operations of the not-shown engine hood or due to wind generated when the vehicle runs, acts on each hood lock 14. The main port of the load is transmitted to from the corresponding hood lock side stays 12 to the side members 17 through the hood lock stay brackets 13 (in detail, in order of the hood lock stay brackets 13, the side member attachment portions 9 and the flange portions 16b of the bumper stays 16), and it is absorbed by the side members 17.

In addition, the withstanding load necessary for the secondary latch is mainly transmitted to and absorbed by the hood lock center stay 10.

Accordingly, the first embodiment can satisfy necessary withstanding load of the hood locks 14 without strength poverty of the radiator core support.

In addition, in the first embodiment, the hood locks 14, the hood lock side stays 12 and the hood lock stay brackets 13 are provided at the both sides of the radiator core support 1, so that the above-described load is transmitted to the corresponding side members 17 and it is suitably dispersed.

Next, the effects of the first embodiment will be described.

As explained above, in the radiator core support of the first embodiment having the hood lock stay member 3, which is provided with the hood locks 14, on the radiator core support 1 of the motor vehicle, the hood lock stay brackets 13 are provided on the hood lock stay member 3 to directly transmit the load acting on the hood lock 14 from the engine hood to the side members 17 through the hood lock member 3. This enables the hood lock stay brackets 13 to transmit the load acting on the hood lock 14 from the hood lock stay member 3 to the side members 13, and accordingly the radiator core support 1 can satisfy the withstanding load necessary for the hood lock 14 without strength poverty of the radiator core support 1.

In addition, the hood lock stay member 3 is fixed with the side members 17, and the hood lock stay member 3, the right and left hood ledges of the vehicle body, which are formed to have a closed cross sectional configuration in the lateral direction of the radiator core support 2 and are positioned over the side members 15, and the side members 17 are connected with one another. Therefore, excess load in the up and down direction of the vehicle body is not transmitted, thereby the rigidity of the vehicle body being improved. As a result, the controllability and stability by a driver can be assured.

Further, the hood lock stay is divided in two, namely a pair of (right and left) hood lock side stays 12 and 12, at its longitudinal central portion. This enables a press die to be compact when a hood lock side stay with a long lateral directional length is manufactured.

In addition, as the member becomes longer, it becomes more difficult in adjusting positions of the fixation holes of connecting portions of the members. But the hood lock side stay is divided in two at the central portion in the longitudinal direction thereof, which results in that it becomes easier to adjust the positions of the connecting portions of the members.

Second Embodiment

Next, a second embodiment according to the present invention will be described. In a description of the second embodiment, parts/portions similar to those of the first embodiment are omitted in the drawings, or they are indicated by the same reference numbers, their descriptions will be omitted, and only their differentia will be explained.

Figure 7:
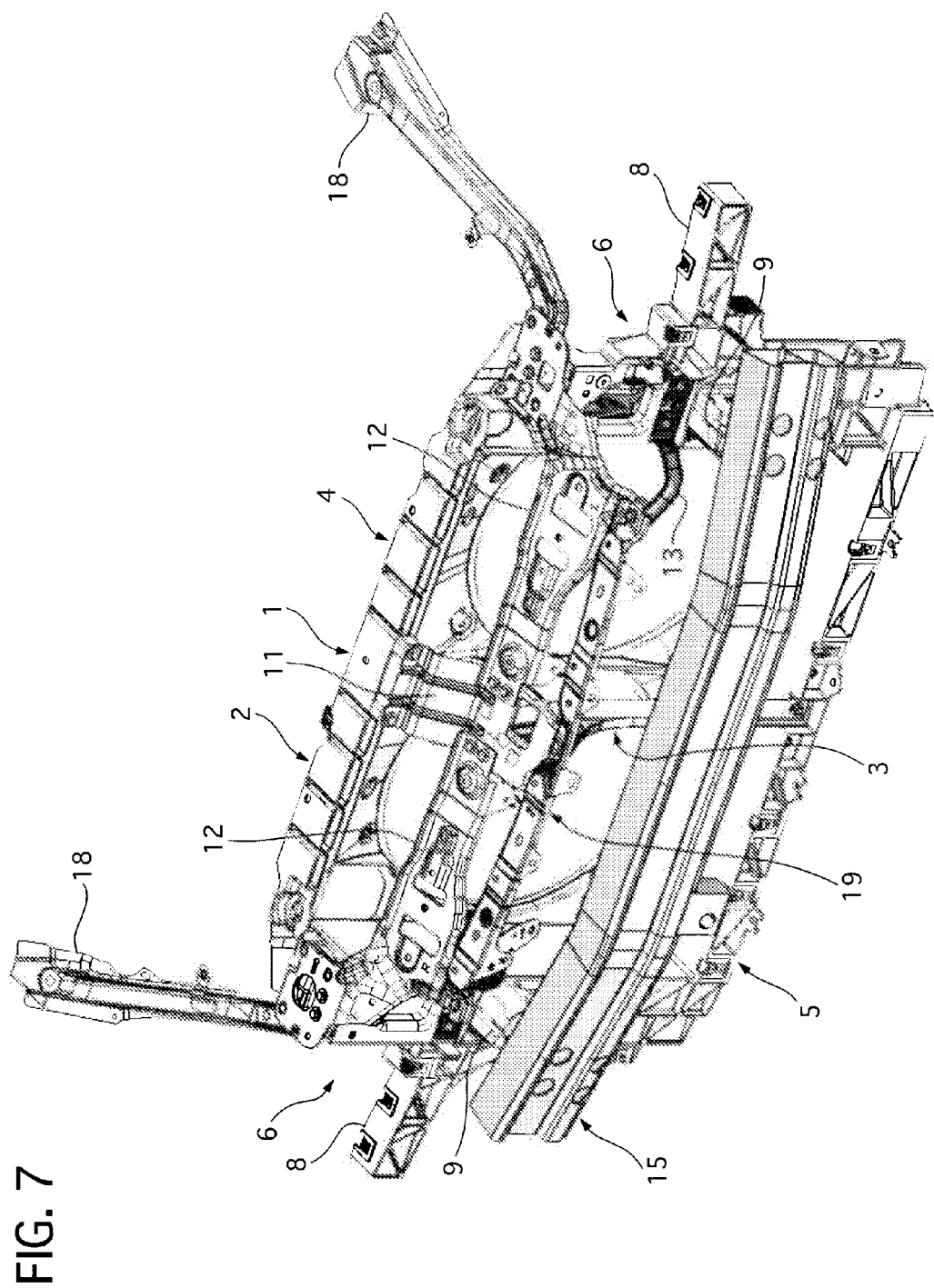
FIG. 7 is a perspective view, seen from the front side, showing a radiator core support with its peripheral members of a second embodiment according to the present invention.
Figure 8:
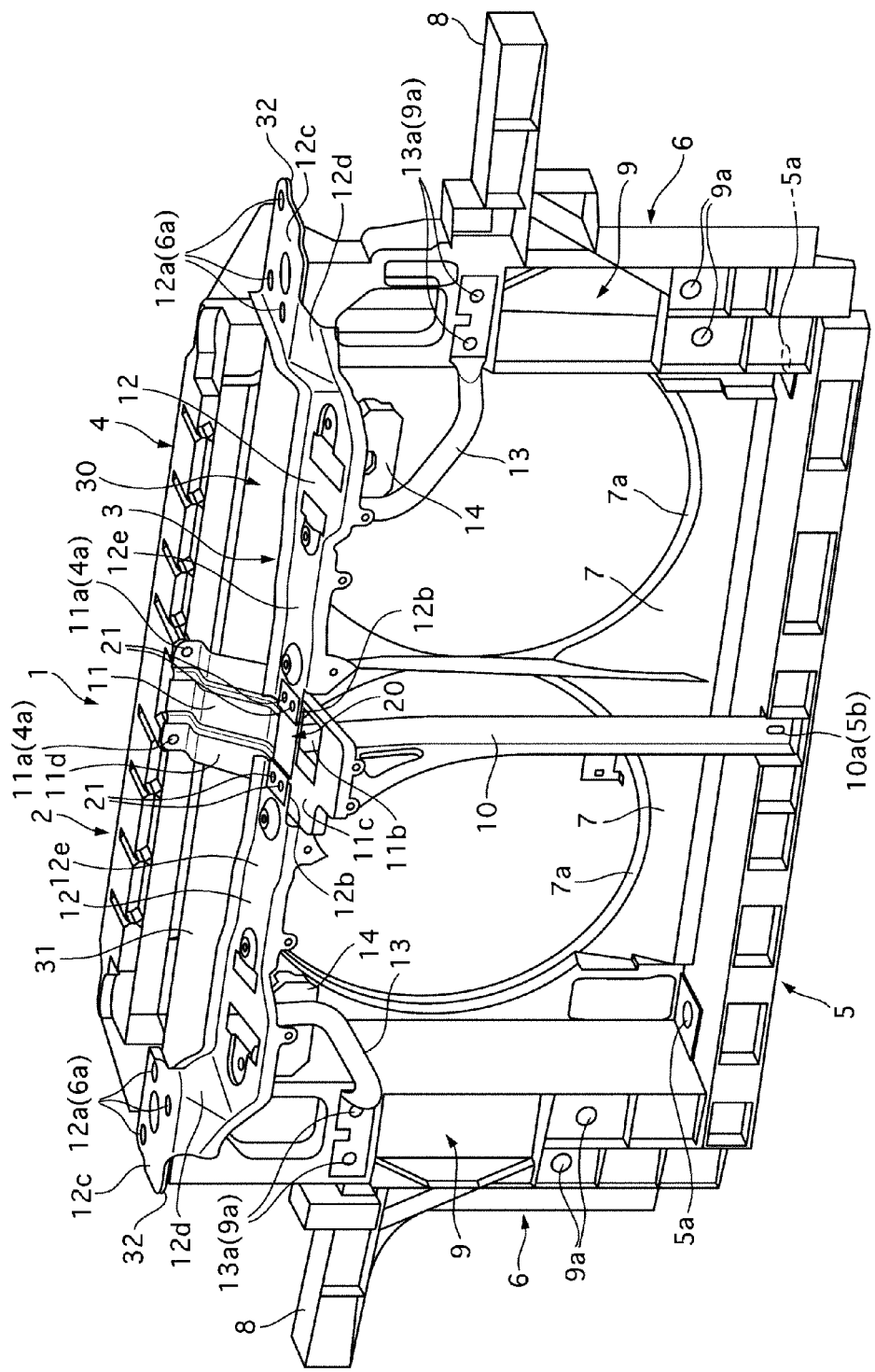
FIG. 8 is a perspective view, seen from the front side, showing the radiator core support of the second embodiment.
Figure 9:
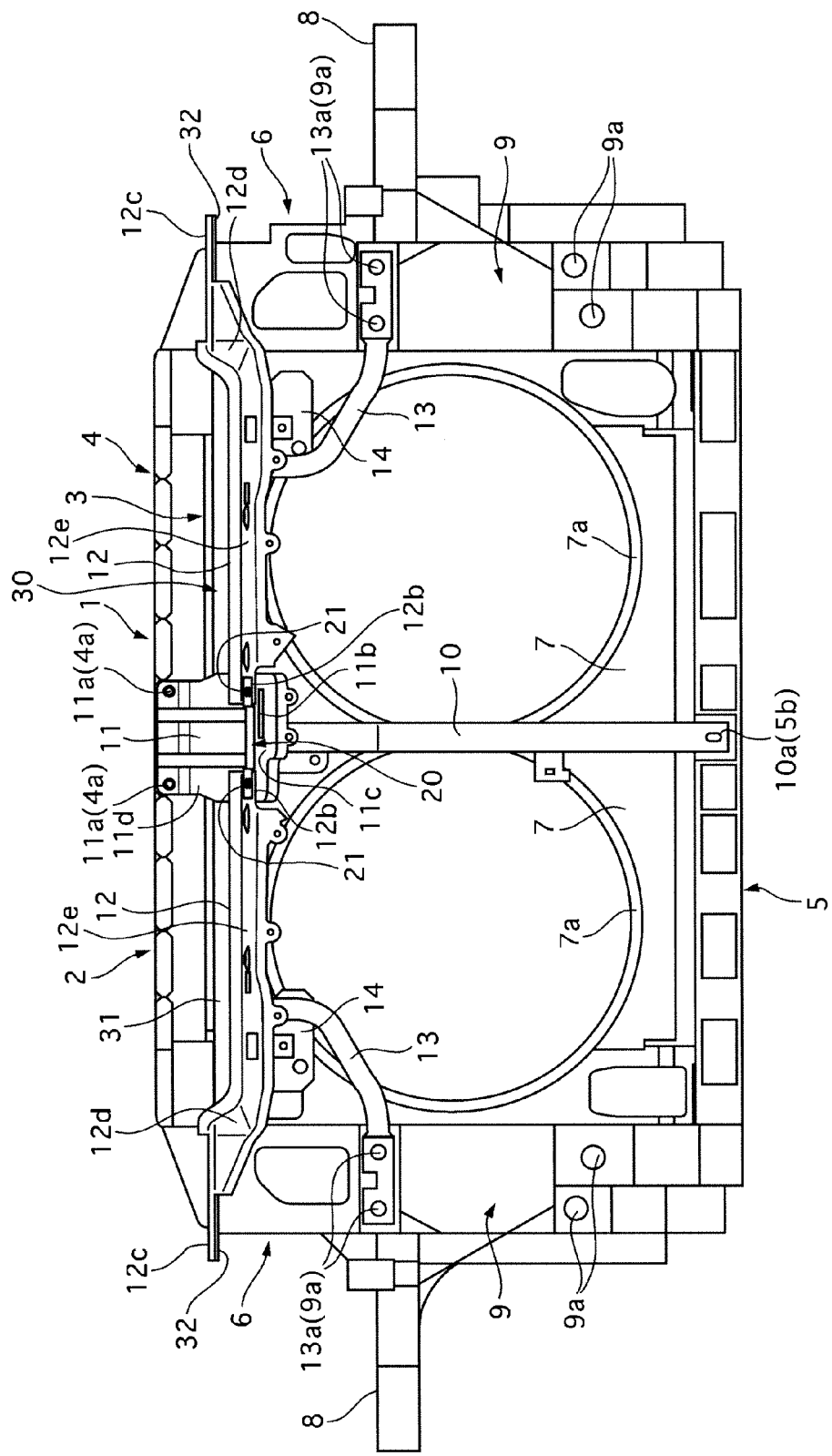
FIG. 9 is a front view showing the radiator core support of the second embodiment.
Figure 10:
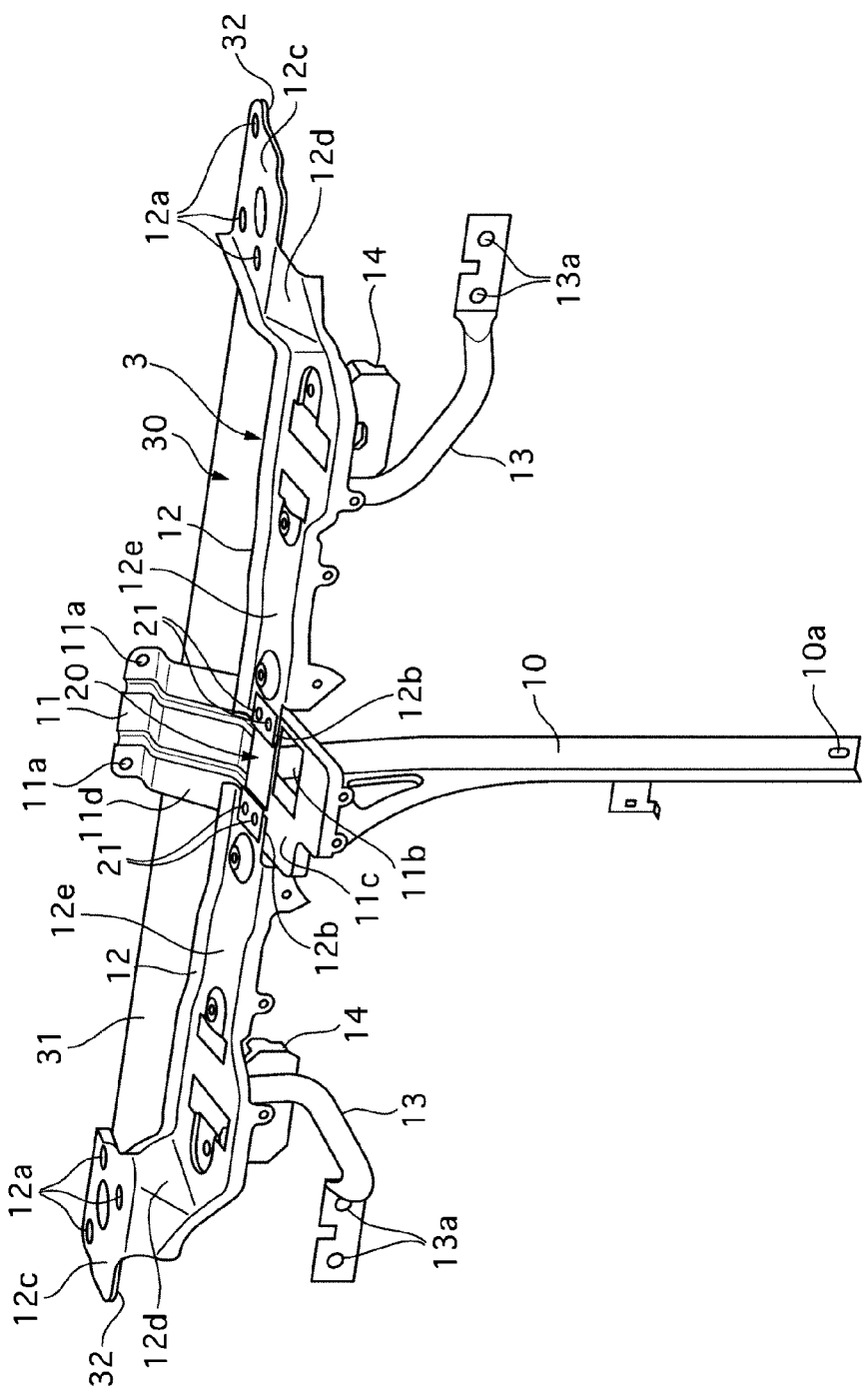
FIG. 10 is a perspective view showing a hood lock stay member of the second embodiment.
Figure 11:
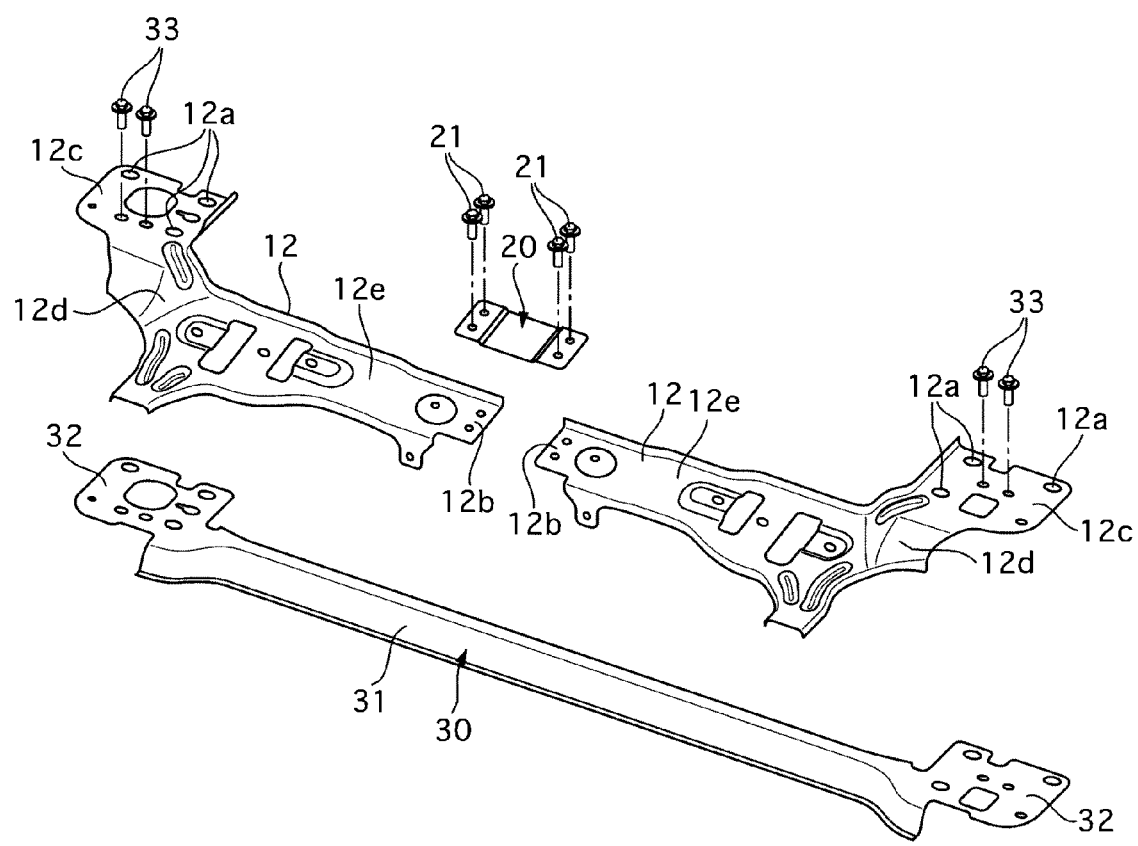
FIG. 11 is an exploded perspective view showing the hood lock stay member of the second embodiment.

The second embodiment is a modified example of the radiator core support of the first embodiment. FIG. 7 is a perspective view, seen from a front side, showing a radiator core support with its peripheral devices of the second embodiment, FIG. 8 is a perspective view, seen from the front side, showing the radiator core support of the second embodiment, FIG. 9 is a front view showing the radiator core support of the second embodiment, FIG. 10 is a perspective view showing a hood lock stay member of the second embodiment, and FIG. 11 is an exploded perspective view showing the hood lock stay member of the second embodiment.

The second embodiment is different from the first embodiment in that a first reinforcement member 20 and a second reinforcement member 30 are added to a hood lock stay member 3.

That is, the first reinforcement member 20 is formed like a plate, which functions to reinforce a connecting state between both base end portions 12b and 12b of right and left hood lock side stays 12 and 12 which are formed by being divided in two.

Further, right and left end portions of the first reinforcement member 20 are overlapped with upper surfaces of the base end portions 12b and 12b of the right and left hood lock side stays 12 and 12, and the base end portions 12b and 12b are connected by bolts 21 with the right and left end portions of the first reinforcement member 20 and the right and left end portions of connecting portions 11c and 11c of a center upper portion 11 in a state where the base end portions 12b and 12b are sandwiched between the right and left end portions of the first reinforcement member 20 and the center upper portion 11.

The second reinforcement member 30 is formed with attachment portions 32 and 32 at right and left end portions of a main body portion 31 existing along the right and left hood lock side stays 12 and 12 which function to reinforce the connection between end portions 12c and 12c of the right and left hood lock side stays 12 and 12.

The attachment portions 32 are formed with fixation holes 32a at positions corresponding to fixation holes 12a of the end portions of the hood lock side stays 12 and 12.

In addition, the right and left attachment portions 32 and 32 of the second reinforcement member 30 are overlapped with lower surfaces of the right and left end portions 12c and 12c of the right and left hood lock side stays 12 and 12, and the attachment portions 32 and the end portions 12a are fixed by bolts 33 with radiator core side supports 6. Consequently, the second reinforcement member 30 is arranged among the right and left hood lock side stays 12 and 12, the center upper portion 11 and the radiator core upper support 4.

Further, the hood lock stay member 3 is provided with a hood lock center stay 10 and a metal reinforcement member 19 that is arranged parallel to the front portion of the hood lock side stays 12. The hood lock stay member 3 is not limited to this structure.

Next, the operation and effects of the second embodiment will be described.

As explained above, in the second embodiment, the right and left end portions of the first reinforcement member 20 are overlapped with the upper surfaces of the base end portions 12b and 12b of the right and left hood lock side stays 12 and 12, and the base end portions 12b and 12b are connected by bolts 21 with the right and left end portions of the first reinforcement member 20 and the right and left end portions of the connecting portions 11c and 11c of the center upper portion 11 in the state where the base end portions 12b and 12b are sandwiched between the right and left end portions of the first reinforcement member 20 and the center upper portion 11. Therefore, the radiator core support 1 can maintain high shear rigidity in the longitudinal direction thereof even when the hood lock side stay is divided in two in the longitudinal direction thereof.

In addition, the radiator core support 1 is constructed in such a way that, with reference to two sides of the radiator core upper support 4 and the radiator core lower support 5 which connect right and left hood lock stay brackets 13 and 13 and the hood lock center stay 10, the second reinforcement member 30 that connects the right and left hood lock stay brackets 13 and 13 is provided to add a third side. The radiator core support 1 can further improve its rigidity in the lateral direction thereof.

While the embodiments have been described above, the present invention is not limited to these embodiments, a design changes and modifications thereof are covered by the present invention as long as they fall within the true spirit and scope of the invention.

For example, a configuration of portions of the radiator core support 1, the number of formations thereof, and positions of the formations thereof, sizes thereof and others may be set appropriately.

In addition, although the both right and left end portions of the first reinforcement member 20 are overlapped with the upper surfaces of the base end portions 12b and 12b of the right and left hood lock side stays 12 and 12, and the base end portions 12b and 12b are connected by bolts 21 with the right and left end portions of the first reinforcement member 20 and the right and left end portions of the connecting portions 11c and 11c of the center upper portion 11 in the state where the base end portions 12b and 12b are sandwiched between the right and left end portions of the first reinforcement member 20 and the center upper portion 11, they may be fixed in a state where the first reinforcement member 20 and the connecting portions 11c and 11c of the center upper portion 11 are arranged, being turned upside down.

Further, their fixing means may be other means such as fastening by rivets or welding.

Further, a fastening method of the first reinforcement member 20 and the center upper portion 11 may be, what is called, an one-touch fastening means, where one of the first reinforcement member 20 and the center upper portion 11 is formed by a plastically deformable member, which is fixed with the other of the first reinforcement member 20 and the center upper portion 11 through through-holes provided near the base end portions 12b and 12b of the both hood lock side stays 12 and 12.

In addition, the hood lock side stays may be formed as one unit.

The invention claimed is:

1. A radiator core support having a hood lock stay on the radiator core support of a motor vehicle, the hood lock stay being provided with a hood lock,
   wherein the radiator core support comprises a radiator core support main body and a hood lock stay member,
   wherein the radiator core support main body includes:
      a radiator core upper support extending in a lateral direction of the vehicle body,
      a radiator core lower support arranged below and parallel to the radiator core upper support, and
      radiator core side supports connecting end portions of the radiator core upper support and the radiator core lower support,
   wherein the hood lock stay member includes the hood lock stay, the hood lock provided on the hood lock stay being engageable with an engine hood, and a transmission element that connects the hood lock stay and side members of a vehicle body to transmit a load acting on the hood lock from the hood lock stay to the side members,
   wherein the radiator core support main body comprises side member attachment portions that are provided at intermediate portions of each radiator core side support and are fixed with the side members of the vehicle body,
   wherein the hood lock stay member comprises hood lock side stays that are arranged at positions higher than positions of the side member attachment portions and extend in the lateral direction of the vehicle body to be fixed with the radiator core side supports, and
   wherein the hood lock provided on each of the hood lock side stays, and hood stay brackets, acting as the transmission element, are connected in proximity to the hood locks of the hood lock side stays to extend toward the side member attachment portions comprising the hood stay brackets and fixed with the side members.

2. The radiator core support according to claim 1, further comprising:
   a second reinforcement member that is formed with attachment portions at right and left end portions of main body portions along the hood lock side stays, wherein
   the second reinforcement member is fixed at both attachment portions thereof with both end portions of the hood lock side stays.

3. The radiator core support according to claim 2,
   wherein the radiator core support main body comprises plastic material, and the hood lock stay member is formed of metal material.

4. The radiator core support according to claim 1, wherein the radiator core support main body comprises plastic material, and the hood lock stay member is formed of metal material.

5. The radiator core support according to claim 1,
   wherein the hood lock stay member includes a hood lock stay center that is fixed with intermediate portions of the radiator core upper support and the radiator core lower support and is fixed with the hood lock side stays.

6. The radiator core support according to claim 5,
   wherein the hood lock center stay is fixed at an upper end portion thereof with a center portion of the radiator core upper support through a center upper portion,
   wherein the hood lock side stays are divided in two at a central portion in the lateral direction of the vehicle body,
   wherein the center upper portion is overlapped with one end portion of the hood lock side stays, a first reinforcement member is overlapped with another end portion, and
   wherein the center upper portion, the hood lock side stays and the first reinforcement member are laminated to be fixed to each other.

7. The radiator core support according to claim 6, further comprising:
   a second reinforcement member that is formed with attachment portions at right and left end portions of main body portions along the hood lock side stays,
   wherein the second reinforcement member is fixed at both attachment portions thereof with end portions of the hood lock side stays.

8. The radiator core support according to claim 7,
   wherein the radiator core support main body comprises plastic material, and the hood lock stay member is formed of metal material.

9. The radiator core support according to claim 5, further comprising:
   a second reinforcement member that is formed with attachment portions at right and left end portions of main body portions along the hood lock side stays,
   wherein the second reinforcement member is fixed at both attachment portions thereof with both end portions of the hood lock side stays.

10. The radiator core support according to claim 9,
    wherein the radiator core support main body comprises plastic material, and the hood lock stay member is formed of metal material.

11. The radiator core support according to claim 5,
    wherein the radiator core support main body comprises plastic material, and the hood lock stay member is formed of metal material.

* * * * *